US012755474B2

(12) United States Patent
Odding et al.

(10) Patent No.: US 12,755,474 B2
(45) Date of Patent: Oct. 6, 2026

(54) VOLUMETRIC VIDEO PROCESSING SYSTEM AND METHOD

(71) Applicant: Viverse Limited, Dublin (IE)

(72) Inventors: Aart Victor Odding, Dublin (IE); Teemu Petteri Typpi, Dublin (IE); Tuomo Matias Paavilainen, Dublin (IE)

(73) Assignee: Viverse Limited, Dublin (IE)

( * ) Notice: Subject to any disclaimer, the term of this patent is extended or adjusted under 35 U.S.C. 154(b) by 113 days.

(21) Appl. No.: 18/818,626

(22) Filed: Aug. 29, 2024

(65) Prior Publication Data

US 2025/0078388 A1 Mar. 6, 2025

Related U.S. Application Data

(60) Provisional application No. 63/536,037, filed on Aug. 31, 2023.

(51) Int. Cl.

*G06T 15/04* (2011.01)
*G06T 9/00* (2006.01)
*G06T 15/08* (2011.01)

(52) U.S. Cl.

CPC ................ *G06T 15/04* (2013.01); *G06T 9/00* (2013.01); *G06T 15/08* (2013.01)

(58) Field of Classification Search

None

See application file for complete search history.

(56) References Cited

U.S. PATENT DOCUMENTS

| | | | |
|---|---|---|---|
| 11,120,623 B2 | 9/2021 | Jiang et al. | |
| 2018/0005449 A1* | 1/2018 | Wallner ................ | G06T 15/205 |
| 2020/0244993 A1 | 7/2020 | Schwarz et al. | |
| 2020/0372709 A1 | 11/2020 | Ponjou Tasse et al. | |
| 2021/0360236 A1 | 11/2021 | Kirk et al. | |

FOREIGN PATENT DOCUMENTS

| | | |
|---|---|---|
| CN | 102113303 | 6/2011 |
| CN | 102484734 | 5/2012 |
| CN | 107770560 | 3/2018 |
| CN | 113542864 | 10/2021 |
| CN | 116129011 | 5/2023 |

(Continued)

OTHER PUBLICATIONS

"Search Report of Europe Counterpart Application", issued on Nov. 27, 2024, p. 1-p. 5.

(Continued)

*Primary Examiner* — Nurun Flora
(74) *Attorney, Agent, or Firm* — JCIPRNET

(57) ABSTRACT

A volumetric video processing system and method is provided. The volumetric video processing system includes a storage circuit and a processor. The storage circuit is configured to storing a program code. The processor is coupled to the storage circuit and accessing the program code to execute: obtaining a texture of a frame of a volumetric video; generating a timecode based on a frame number of the frame; embedding the timecode into the texture to generate an embedded texture; obtaining a 3D model of the frame; and storing the embedded texture and the 3D model together as the volumetric video.

20 Claims, 6 Drawing Sheets

(56) References Cited

FOREIGN PATENT DOCUMENTS

WO 2019034808 2/2019

OTHER PUBLICATIONS

Atlas Foundation, “Universal Volumetric”, retrieved on Oct. 9, 2025, Available at: https://github.com/AtlasFoundation/Volumetric.
Keijiro Takahashi, “Bibtc—Burnt-In Binary Time Code”, retrieved on Oct. 9, 2025, Available at: https://github.com/keijiro/Bibtc.
“Office Action of Japan Counterpart Application”, issued on Oct. 16, 2025, p. 1-p. 4.
“Office Action of Taiwan Counterpart Application”, issued on Mar. 14, 2025, p. 1-p. 8.
Abhaya Dhathri Arige, “I need to save the animation after loading once, in the form of sequence of 3d files (instead of a 2d video-something like vrml) and play them whenever wanted instead of loading them everytime . Is there any way to do that.”, blenderartists.org, Mar. 2019, Available at: https://blenderartists.org/t/stop-motion-obj-for-blender-4-x-obj-stl-ply-sequence-importer-v2-3-0/670105/51?page=7.
Ferchu, “Import sequence of obj files to multiple frames”, blender.stackexchange.com, Aug. 24, 2016, Available at: https://blender.stackexchange.com/questions/61544/import-sequence-of-obj-files-to-multiple-frames.
“Office Action of Taiwan Counterpart Application”, issued on Apr. 7, 2026, p. 1-p. 9.
“Office Action of United Arab Emirates Counterpart Application”, issued on Mar. 25, 2026, p. 1-p. 7.
“Office Action of Japan Counterpart Application”, issued on Feb. 18, 2026, p. 1-p. 6.

* cited by examiner

300

VOLUMETRIC VIDEO PROCESSING SYSTEM AND METHOD

CROSS-REFERENCE TO RELATED APPLICATION

This application claims the priority benefit of U.S. provisional application Ser. No. 63/536,037, filed on Aug. 31, 2023. The entirety of the above-mentioned patent application is hereby incorporated by reference herein and made a part of this specification.

BACKGROUND

Technical Field

The disclosure relates to a volumetric video processing system; particularly, the disclosure relates to a volumetric video processing system and a volumetric video processing method.

Description of Related Art

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided to the user over the web.

SUMMARY

The disclosure is direct to a volumetric video processing system and a volumetric video processing method, so as to achieve real-time streaming of a volumetric video.

In this disclosure, a volumetric video processing system is provided. The volumetric video processing system includes a storage circuit and a processor. The storage circuit is configured to storing a program code. The processor is coupled to the storage circuit and accessing the program code to execute: obtaining a texture of a frame of a volumetric video; generating a timecode based on a frame number of the frame; embedding the timecode into the texture to generate an embedded texture; obtaining a 3D model of the frame; and storing the embedded texture and the 3D model together as the volumetric video.

In this disclosure, a volumetric video processing method is provided. The volumetric video processing method includes: obtaining a texture of a frame of a volumetric video; generating a timecode based on a frame number of the frame; embedding the timecode into the texture to generate an embedded texture; obtaining a 3D model of the frame; and storing the embedded texture and the 3D model together as the volumetric video.

In this disclosure, a volumetric video processing method is provided. The volumetric video processing method includes: obtaining a frame of a volumetric video; obtaining a texture video from the frame of the volumetric video; obtaining a texture and a timecode based on an embedded texture of the texture video; obtaining a frame number of the frame based on the timecode; obtaining a 3D model of the frame from the volumetric video based on the frame number; and applying the texture on the 3D model to generate a rendered 3D model.

Based on the above, according to the volumetric video processing system and method, based on the timecode embedded in the volumetric video, the volumetric video is streaming on the web in an efficient and low-latency manner.

To make the aforementioned more comprehensible, several embodiments accompanied with drawings are described in detail as follows.

BRIEF DESCRIPTION OF THE DRAWINGS

The accompanying drawings are included to provide a further understanding of the disclosure, and are incorporated in and constitute a part of this specification. The drawings illustrate exemplary embodiments of the disclosure and, together with the description, serve to explain the principles of the disclosure.

DESCRIPTION OF THE EMBODIMENTS

Figure 1:
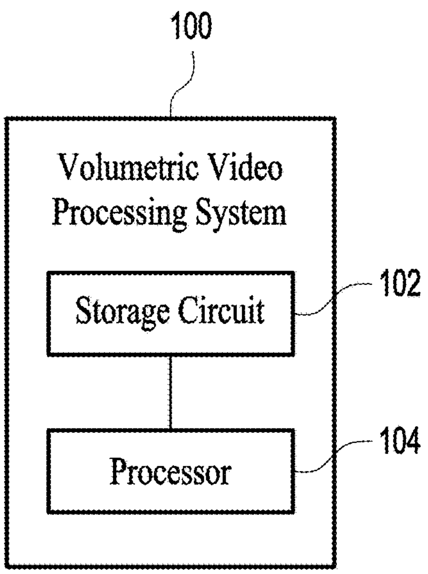
FIG. 1 is a schematic diagram of a volumetric video processing system according to an embodiment of the disclosure.

Reference will now be made in detail to the exemplary embodiments of the disclosure, examples of which are illustrated in the accompanying drawings. Whenever possible, the same reference numbers are used in the drawings and the description to refer to the same or like components.

Certain terms are used throughout the specification and appended claims of the disclosure to refer to specific components. Those skilled in the art should understand that electronic device manufacturers may refer to the same components by different names. This article does not intend to distinguish those components with the same function but different names. In the following description and rights request, the words such as "comprise" and "include" are open-ended terms, and should be explained as "including but not limited to . . . ".

The term "coupling (or connection)" used throughout the whole specification of the present application (including the appended claims) may refer to any direct or indirect connection means. For example, if the text describes that a first device is coupled (or connected) to a second device, it should be interpreted that the first device may be directly connected to the second device, or the first device may be indirectly connected through other devices or certain connection means to be connected to the second device. The terms “first”, “second”, and similar terms mentioned throughout the whole specification of the present application (including the appended claims) are merely used to name discrete elements or to differentiate among different embodiments or ranges. Therefore, the terms should not be regarded as limiting an upper limit or a lower limit of the quantity of the elements and should not be used to limit the arrangement sequence of elements. In addition, wherever possible, elements/components/steps using the same reference numerals in the drawings and the embodiments represent the same or similar parts. Reference may be mutually made to related descriptions of elements/components/steps using the same reference numerals or using the same terms in different embodiments.

It should be noted that in the following embodiments, the technical features of several different embodiments may be replaced, recombined, and mixed without departing from the spirit of the disclosure to complete other embodiments. As long as the features of each embodiment do not violate the spirit of the disclosure or conflict with each other, they may be mixed and used together arbitrarily.

In order to bring an immersive experience to user, technologies related to extended reality (XR), such as augmented reality (AR), virtual reality (VR), and mixed reality (MR) are constantly being developed. AR technology allows a user to bring virtual elements to the real world. VR technology allows a user to enter a whole new virtual world to experience a different life. MR technology merges the real world and the virtual world. Further, to bring a fully immersive experience to the user, visual content, audio content, or contents of other senses may be provided to the user over the web.

For example, volumetric video is a type of video where each frame is not a two-dimensional image, but instead a three-dimensional model generated from video captures from multiple different angles. Traditionally, each model consists of the three-dimension (3D) data (the mesh) and a texture that is applied to the mesh. A volumetric video usually has 25, 30 or 60 reconstructed 3D models per second, which means to be able stream a volumetric video over the web, a large amount of data needs to be transferred.

While a volumetric video including 3D geometry data is streaming to the user over the web, it is important that the user does not need to wait for a long time while loading the contents of the volumetric video. Therefore, at the stage of creating the volumetric video, the size and the composition of the contents of the volumetric video matters.

Further, while the user is viewing the volumetric video, the traditional methods of loading the volumetric video over the web often load all the data at once at startup (which causes long loading times). That is, the user may have no options to change the quality of the volumetric video according to a condition of the internet. Therefore, the user experience may be interrupted due to the waiting time of loading. In light of the above, it is the pursuit of people skilled in the art to provide an efficient and low-latency manner to stream the volumetric video over the web.

FIG. 1 is a schematic diagram of a volumetric video processing system according to an embodiment of the disclosure. With reference to FIG. 1, a volumetric video processing system 100 is depicted. In different embodiments, a volumetric video processing system 100 may be implemented as various smart devices and/or computer devices, but is not limited thereto. In one embodiment, the volumetric video processing system 100 may be used as an encoder to generate the volumetric video. In another embodiment, the volumetric video processing system 100 may be a decoder, a player, or a game engine to play the volumetric video.

In FIG. 1, the volumetric video processing system 100 includes a storage circuit 102 and a processor 104. The storage circuit 102 is, for example, any type of fixed or removable random access memory (RAM), read-only memory (ROM), flash memory, hard disk, other similar devices, or a combination of these devices and may be used to record multiple program codes or modules.

The processor 104 is coupled to the storage circuit 102 and may be a general purpose processor, a special purpose processor, a conventional processor, a digital signal processor, multiple microprocessors, one or more microprocessors combined with a digital signal processor core, a controller, a microcontroller, an application specific integrated circuit (ASIC), a field programmable gate array (FPGA), any other kind of integrated circuits, state machines, processors based on advanced RISC machine (ARM), and the like.

In an embodiment of the invention, the processor 104 may access the modules and program codes recorded in the storage circuit 102 to implement a volumetric video processing method proposed by the disclosure, and the details of which are described below.

Figure 2:
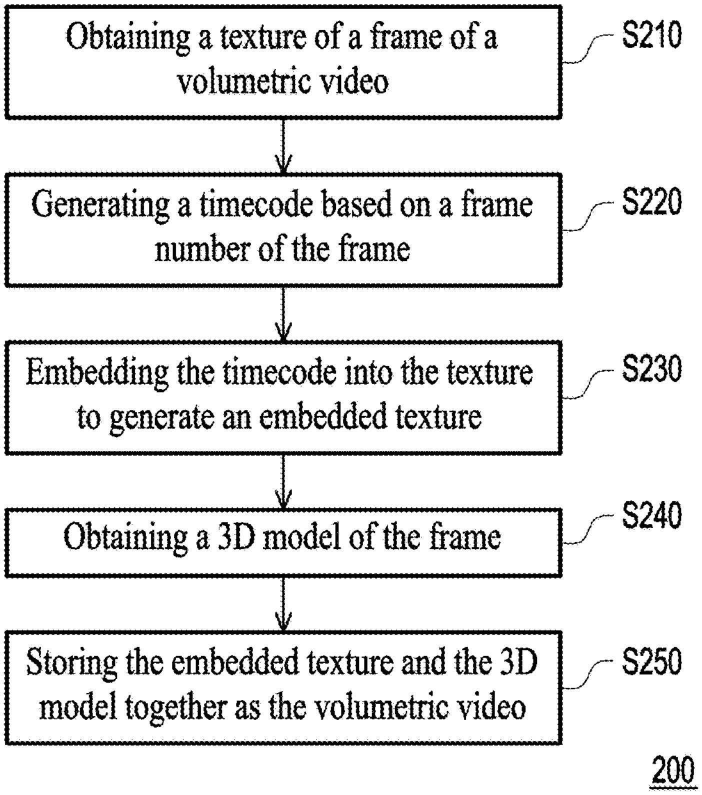
FIG. 2 is a schematic flowchart of a volumetric video processing method according to an embodiment of the disclosure.

FIG. 2 is a schematic flowchart of a volumetric video processing method according to an embodiment of the disclosure. With reference to FIG. 1 and FIG. 2, a volumetric video processing method of this embodiment may be executed by the volumetric video processing system 100 in FIG. 1, and the details of each step in FIG. 2 will be described below with the components shown in FIG. 1.

First, in a step S210, the processor 104 may be configured to obtain a texture of a frame (also known as a selected frame) of a volumetric video. In one embodiment, the volumetric video may include a plurality of frames and each frame of the volumetric video corresponds to a texture, a 3D model, and a frame number. The texture may be applied to the 3D to form 3D geometry data of the frame. The frame number may be configured to represent an order of the frame within the plurality of frames. However, this disclosure is not limited thereto.

Next, in a step S220, the processor 104 may be configured to generate a timecode based on the frame number of the frame (the selected frame). In one embodiment, the frame number may be converted from a text to an image to generate the timecode. That is, the frame number may be represented graphically by the timecode, for example, a binary image. However, this disclosure is not limited thereto.

Afterwards, in a step S230, the processor 104 may be configured to embed (or encode) the timecode into the texture to generate an embedded texture. That is, by loading an embedded texture of a certain frame, a frame number of the certain frame may be recognized. In one embodiment, the timecode may be placed in the bottom of the texture. In another embodiment, the timecode may be placed in the top of the texture. However, this disclosure is not limited thereto. In other words, this disclosure does not limit the location of the timecode in the texture.

Further, in a step S240, the processor 104 may be configured to obtain a 3D model of the frame. In one embodiment, the 3D model may include a plurality of vertices and the plurality of vertices may form a plurality of triangle meshes. By applying the embedded mesh on the 3D model, 3D geometry data of one frame may be formed.

Moreover, in a step S250, the processor 104 may be configured to storing the embedded texture and the 3D model together as the volumetric video. In one embodiment, the embedded texture and the 3D model may be stored together and streamed over the web.

Based on the above, since the timecode is located within the embedded texture, while the user is searching for a certain frame of the volumetric video, only part of the embedded textures of a plurality of frames may be needed to be loaded. That is, the user may be smart at loading the frames near the current timecode easily. Therefore, the volumetric video may be streaming on the web in an efficient and low-latency manner.

In addition, the implementation details of the volumetric video processing system 100 and the volumetric video processing method 200 may be referred to the descriptions of FIG. 3 to FIG. 8 as follows to obtain sufficient teachings, suggestions, and implementation embodiments. In some embodiments, functions of a generator of a volumetric video and/or functions of a player or a game engine for playing the volumetric video may be executed by the processor 104 of the volumetric video processing system 100, but this disclosure is not limited thereto.

Figure 3:
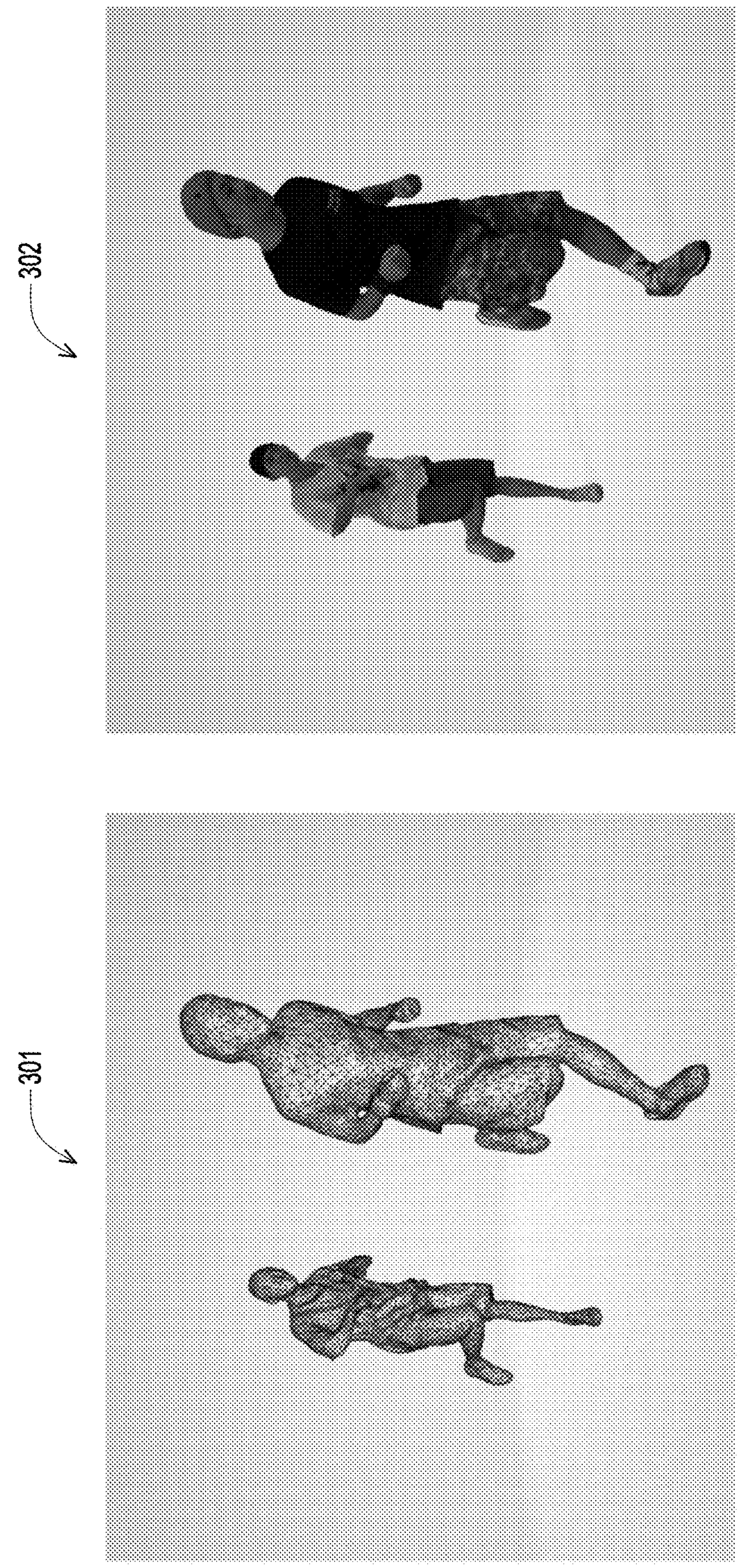
FIG. 3 is a schematic diagram of a rendering scenario of a 3D model according to an embodiment of the disclosure.

FIG. 3 is a schematic diagram of a rendering scenario of a 3D model according to an embodiment of the disclosure. With reference to FIG. 3, a rendering scenario 300 depicts an original 3D model 301 and a rendered 3D model 302.

In one embodiment, a 3D model in the volumetric video may be created by converting meshes of a plurality of vertices to triangle meshes of the plurality of vertices as shown in the original 3D model 301. Further, a list of the plurality of vertices and a list of indexes to connect the vertices into triangles may be stored. Furthermore, for each vertex, a position and a uv coordinate are stored, while normals may be discarded. Moreover, a Draco algorithm may be used to compress the 3D meshes as Draco files (i.e., file extension is .drc). However, this disclosure is note limited thereto. In addition, volumetric videos with any kinds of volumetric video file formats may be read to extract mesh data of the 3D models from the volumetric videos. That is, all kinds of volumetric video file formats may be supported and utilized to create the 3D model.

In one embodiment, by applying the texture on the triangle meshes of the original 3D model 301, the rendered 3D model 302 may be generated. This process of applying the texture on the original 3D model 301 to create the rendered 3D model 301 is usually called "rendering".

It is noted that, in order to create the volumetric video (e.g., an animated 3D model), the rendered 3D model 302 may move frame by frame. Therefore, a frame number may be used to represent each frame of the 3D model 302. Conventionally, the textures and the meshes of the original 3D model 301 are stored frame by frame in the volumetric video. That is, for each frame, a texture and a mesh of an original 3D model 301 are stored individually. For example, for a volumetric video with 30 frames, there may be 30 textures and 30 meshes of 30 3D models 301. Therefore, the overall size of the volumetric video may be huge. In other words, the compression ratio of the volumetric video is low.

In one embodiment, for the purpose of decreasing the size of the volumetric video, the textures of volumetric video of all the frames may be compressed as a video to improve the compression ratio. Then, the compressed textures and the meshes of the original 3D model 301 may together form a volumetric video. For example, for a volumetric video with 30 frames, there may be 1 video of the compressed textures and 30 meshes. However, most of the players of the volumetric video do not provide an exact frame number that is currently being played by the players. That is, while the user is searching for a certain frame of the volumetric video, the whole rendered 3D model 302 needs to be loaded by the players. In other words, the whole volumetric video has to be loaded first before the volumetric video is played by the players.

It is worth mentioned that, since most of the volumetric videos are quite large files (e.g., gigabyte size), the time of loading may be long, thereby increasing the time of waiting. Therefore, for the sake of efficiency, a frame number may be converted to a timecode to be embedded or be encoded in each frame of the textures of the volumetric video, thereby reducing the time of waiting.

Figure 4:
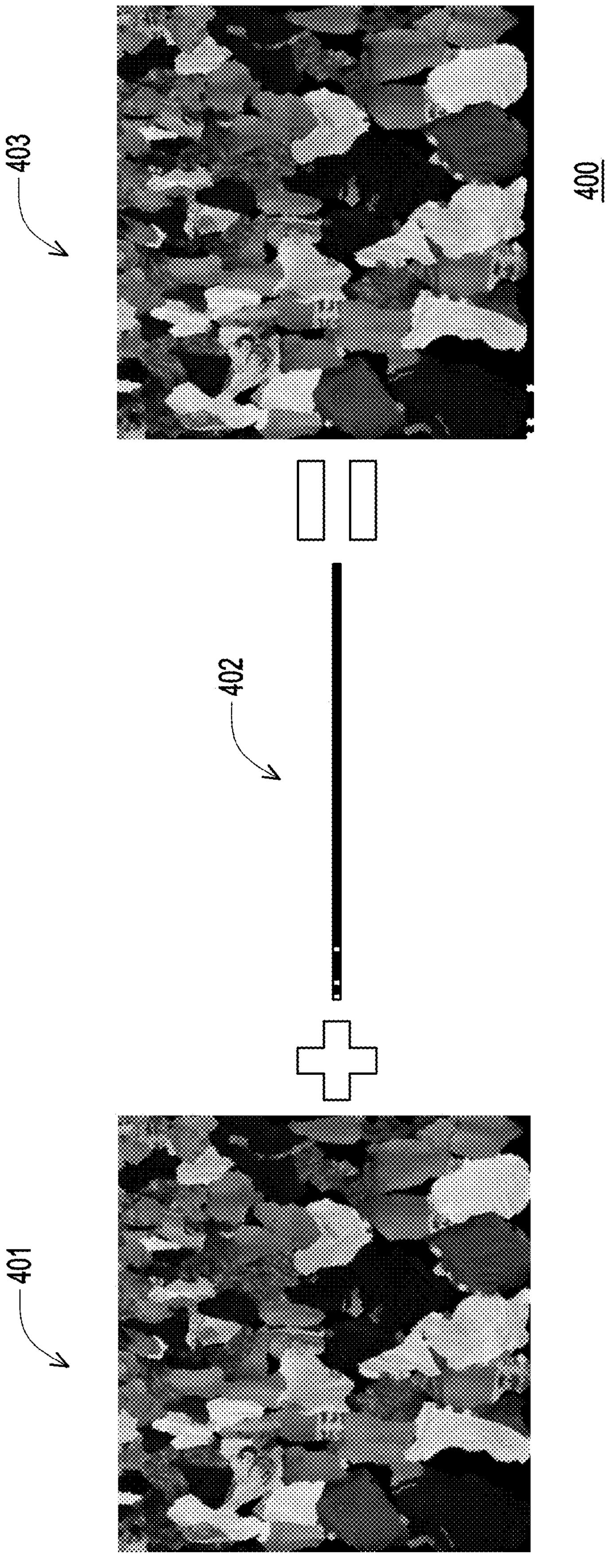
FIG. 4 is a schematic diagram of an embedding scenario of an embedded texture according to an embodiment of the disclosure.

FIG. 4 is a schematic diagram of an embedding scenario of an embedded texture according to an embodiment of the disclosure. With reference to FIG. 1 to FIG. 4, an embedding scenario 400 depicts an exemplary embodiment of embedding a timecode 402 into a texture 401.

In one embodiment, in order to reduce the waiting time, the frame number may be converted to a timecode 402 and the timecode 402 may be embedded or be encoded in textures 401 of each frame of the volumetric video to generate embedded textures 403 of each frame. That is, while the user is searching for a certain frame of the volumetric video, the player of the volumetric video may only need to load the embedded textures 403 nearby the current frame (instead of loading the textures 401 of all the frames or loading both of the textures 401 and the original 3D models 301 of all the frames). In other words, when an embedded texture 403 is read from the volumetric video by the player, an exact frame number (also known as a current frame number) of the current frame may be obtained by sampling the embedded texture 403. Then, since the meshes of the original 3D models 301 are stored as individual files, it is easy to grab the matching meshes nearby the current frame based on the current frame number, and then render the textures 401 and the meshes together to generate rendered 3D models 302 nearby the current frame.

In one embodiment, the frame number may be converted into a binary number first and then the binary number may be converted to a binary image, which is called the timecode 402. That is, the timecode 402 may be configured to graphically represent the frame number. In one embodiment, the timecode 402 may be visually added (disposed) at a top or a bottom of a texture 401 of the original 3D model 301. For example, the timecode 402 may be represented by a row of black squares (■) and white squares (□), while a black square may represent 0 or 1 and a white square may represent 1 or 0. In one embodiment, the timecode 402 may be disposed at a left side or a right side of a texture 401 of the original 3D model 301. For example, the timecode 402 may be represented by a column of black squares and white squares. Moreover, the timecode 402 may be represented by any other specific patterns, such as circles, dots, triangles, stars . . . etc. That is, this disclosure does not limit the specific pattern used to represent the timecode 402. Further, a leftmost square may represent a least significant bit (LSB) of the binary number and a rightmost square may represent a most significant bit (MSB) of the binary number. However, this disclosure is not limited thereto. In this manner, while the user is searching for a certain frame of the volumetric video, only part (e.g., the bottom) of the embedded textures 403 may be needed to be loaded. Therefore, the user does not need to wait for a long time while loading the contents of the volumetric video, thereby increasing the user experience.

Figure 5:
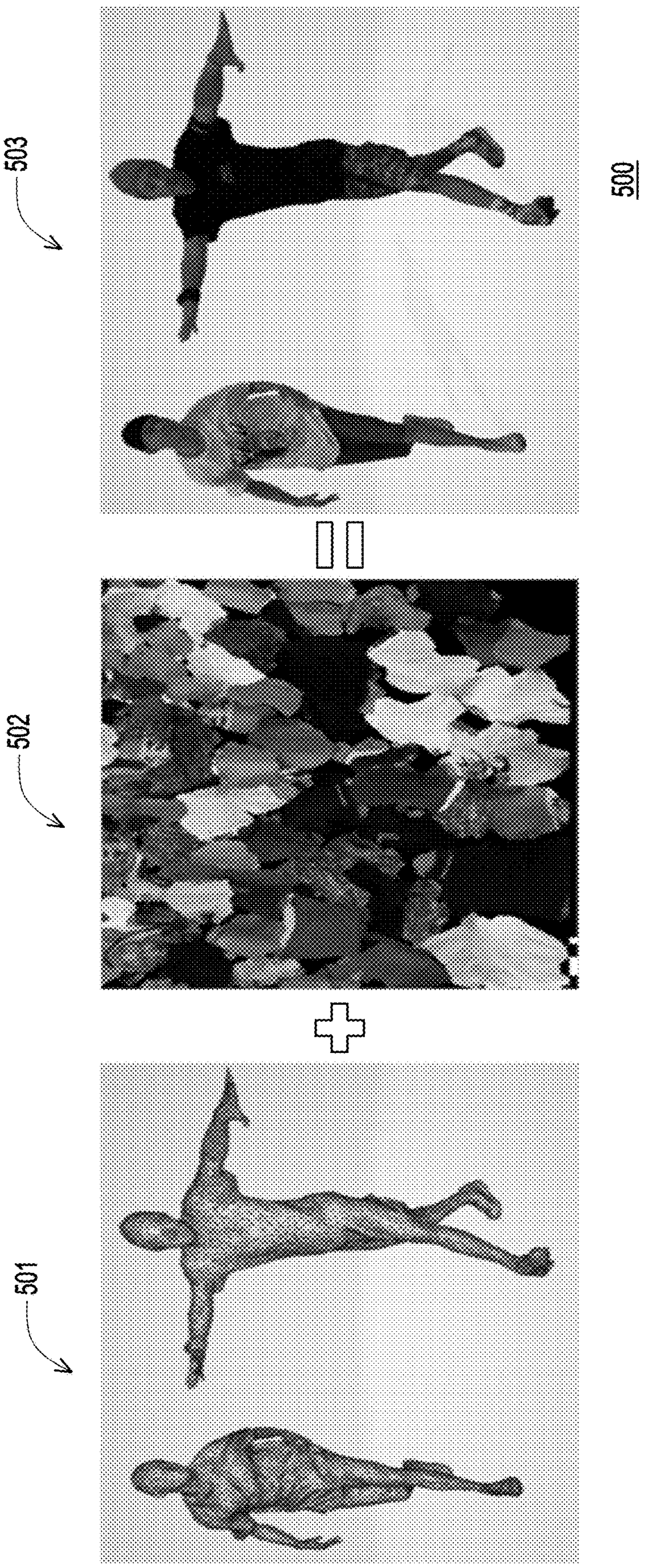
FIG. 5 is a schematic diagram of a rendering scenario of a 3D model according to an embodiment of the disclosure.

FIG. 5 is a schematic diagram of a rendering scenario of a 3D model according to an embodiment of the disclosure. With reference to FIG. 1 to FIG. 5, a rendering scenario 500 depicts a process of generating a rendered 3D model 503 by applying the embedded texture 502 on the original 3D model 501.

Similar as the rendering scenario 300, in the rendering scenario 500, a rendering process of a volumetric video may be performed by combining the embedded textures 502 with the mesh data of the original 3D model 501. The difference is that, during the rendering process, the player may read the timecode 402 out from the embedded textures 502 to check a frame number of the embedded textures 502. That is, an introspection of which frame is being played or to be played may be performed based on only the embedded textures 502. In other words, instead of reading a frame number first and then finding out a corresponding texture 401 separately, by reading the embedded textures 502, the frame number and the corresponding texture 401 may be fetched together. Therefore, the player may be able to find out a texture 401 of a correct frame based on the embedded textures 502 efficiently.

Next, the timecode 402 in the embedded textures 502 may be neglected and the texture 401 fetched from the embedded textures 502 may be applied on the original 3D model 501 to generate the rendered 3D model 503. By rendering the rendered 3D model 503 frame by frame, the volumetric video may be played by the player and be displayed by a display.

It is noted that, as mentioned above, while the volumetric video contains only rendered 3D models 503, the whole volumetric video needs to be loaded before playing of the volumetric video. Therefore, instead of storing the rendered 3D models 503 in the volumetric video, the original 3D model 501 and the embedded texture 502 may be stored individually in the volumetric video. In this manner, at the startup of playing, only original 3D model 501 and the embedded texture 502 of first few frames needs to be loaded by the player, and real-time playing the volumetric video may be achieved.

Figure 6:
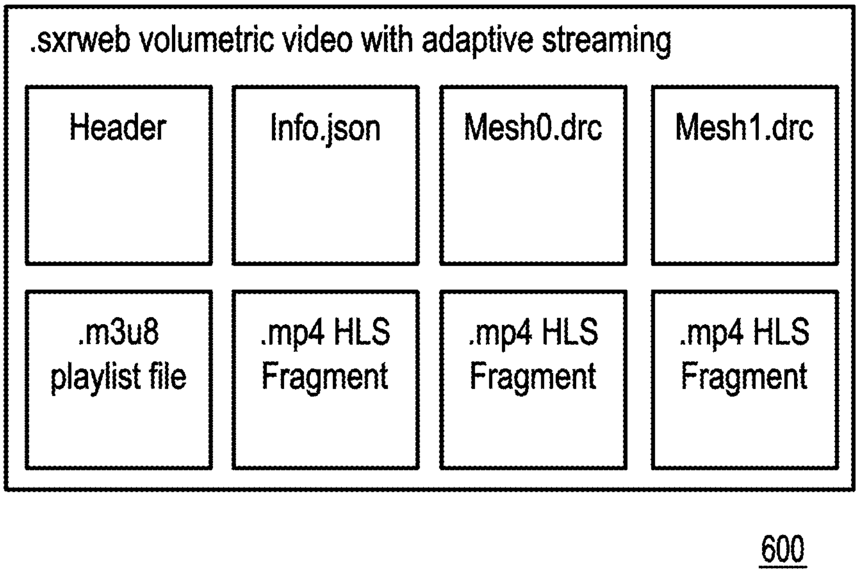
FIG. 6 is a schematic diagram of a file format of SXR-WEB file with adaptive streaming according to an embodiment of the disclosure.
Figure 7:
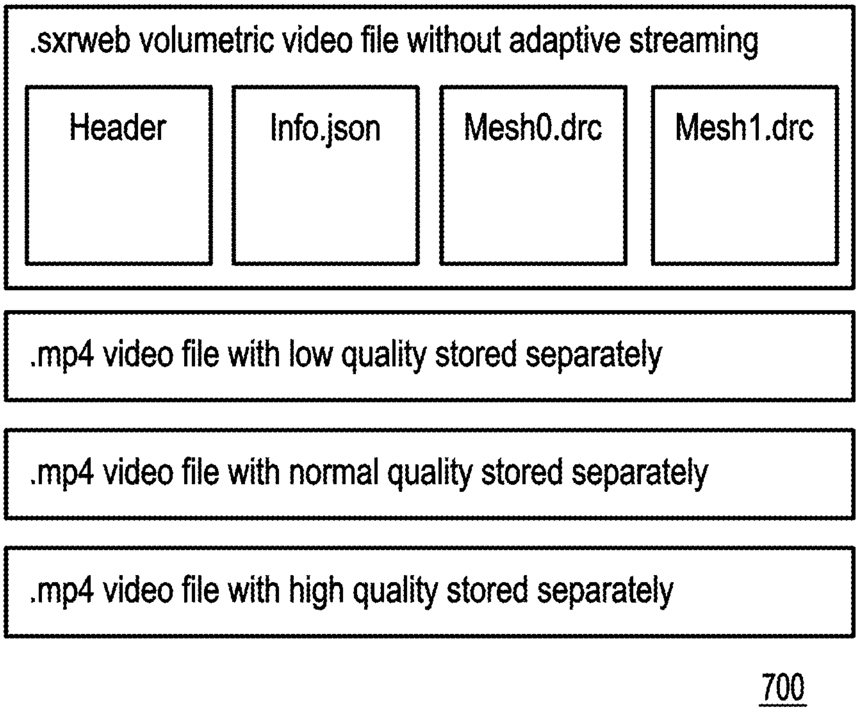
FIG. 7 is a schematic diagram of a file format of SXR-WEB file without adaptive streaming according to an embodiment of the disclosure.

FIG. 6 is a schematic diagram of a file format of SXR-WEB file with adaptive streaming according to an embodiment of the disclosure. FIG. 7 is a schematic diagram of a file format of SXRWEB file without adaptive streaming according to an embodiment of the disclosure. With reference to FIG. 5 to FIG. 7, a file format 600 is an exemplary content of a volumetric video with adaptive streaming and a file format 700 is an exemplary content of a volumetric video without the adaptive streaming.

In one embodiment, in order to store the original 3D model 501 and the embedded texture 502 individually, the file format 600 or the file format 700 may be used to store the textures 502 and the mesh data (e.g., Draco files) of the original 3D model 501 together but separately in a container file. In one embodiment, the container file may be called as a streaming extended reality web (SXRWEB) file (i.e., file extension is .sxrweb). That is, a file format of the container file may be called as SXRWEB, but this disclosure is not limited thereto.

It is noted that, the container file may be streamed over the web or may be played in a game engine to provide the XR content. Most of the websites may support adaptive streaming (e.g., HTTP Live Streaming (HLS)), while most of the game engines (e.g., unreal engine or unity engine) may not support adaptive streaming. Therefore, the file format of a container file for streaming over the web and a container file for a game engine may be different.

In one embodiment, a video making application, such as FFmpeg, may be utilized to create an HLS adaptive bitrate video stream or separate videos outputted at different resolutions (e.g., 2k, 1k, 500p) by converting the textures 401 with the timecode 402 into videos (i.e., frames of the embedded textures 403). In one embodiment, the videos may be called as texture videos, but this disclosure is not limited thereto. If an audio stream is available, the audio stream may be also added using the video making application or stored individually in the container file. These videos may be store in the container file with other information, such as the mesh data (e.g., the Draco files).

Referring to FIG. 6, the file format 600 may be an exemplary file format of a container file with adaptive streaming. As shown in FIG. 6, each container file may include a header file, a JavaScript Object Notation (JSON) file, mesh data (e.g., Draco files) of the original 3D model 501, HLS video fragments (HLS chunks) (i.e., frames of the embedded textures 502), and a playlist file.

In one embodiment, the header file may be configured to hold general information of files inside the container file. For example, the header file may describe some basic information and where the JSON file is located. Further, the JSON file may be configured to describe positions (locations) of rest of the files in the container file. For example, the JSON file may describe the start and end position of each mesh. Furthermore, the mesh data may include meshes of the original 3D models 501 of all the frames. Moreover, the HLS video fragments may be configured to be decoded by the adaptive streaming to obtain a video of the embedded texture 502 of a proper or selected resolution. In addition, the playlist file is configured to store a playback order of the HLS video fragments. However, this disclosure is not limited thereto.

Referring to FIG. 7, the file format 700 may be an exemplary file format of a container file without adaptive streaming. As shown in FIG. 7, each container file may include a header file, a JSON file, mesh data (e.g., Draco files) of the original 3D model 501, low quality video, normal (medium) quality video, and high quality video.

In one embodiment, the header file may be configured to hold general information of files inside the container file. For example, the header file may describe some basic information and where the JSON file is located. Further, the JSON file may be configured to describe positions (locations) of rest of the files in the container file. For example, the JSON file may describe the start and end position of each mesh. Furthermore, the mesh data may include meshes of the original 3D models 501 of all the frames. Moreover, low quality video, medium quality video, and high quality video may be configured to be player by the player based on a proper or selected resolution. However, this disclosure is not limited thereto.

Figure 8:
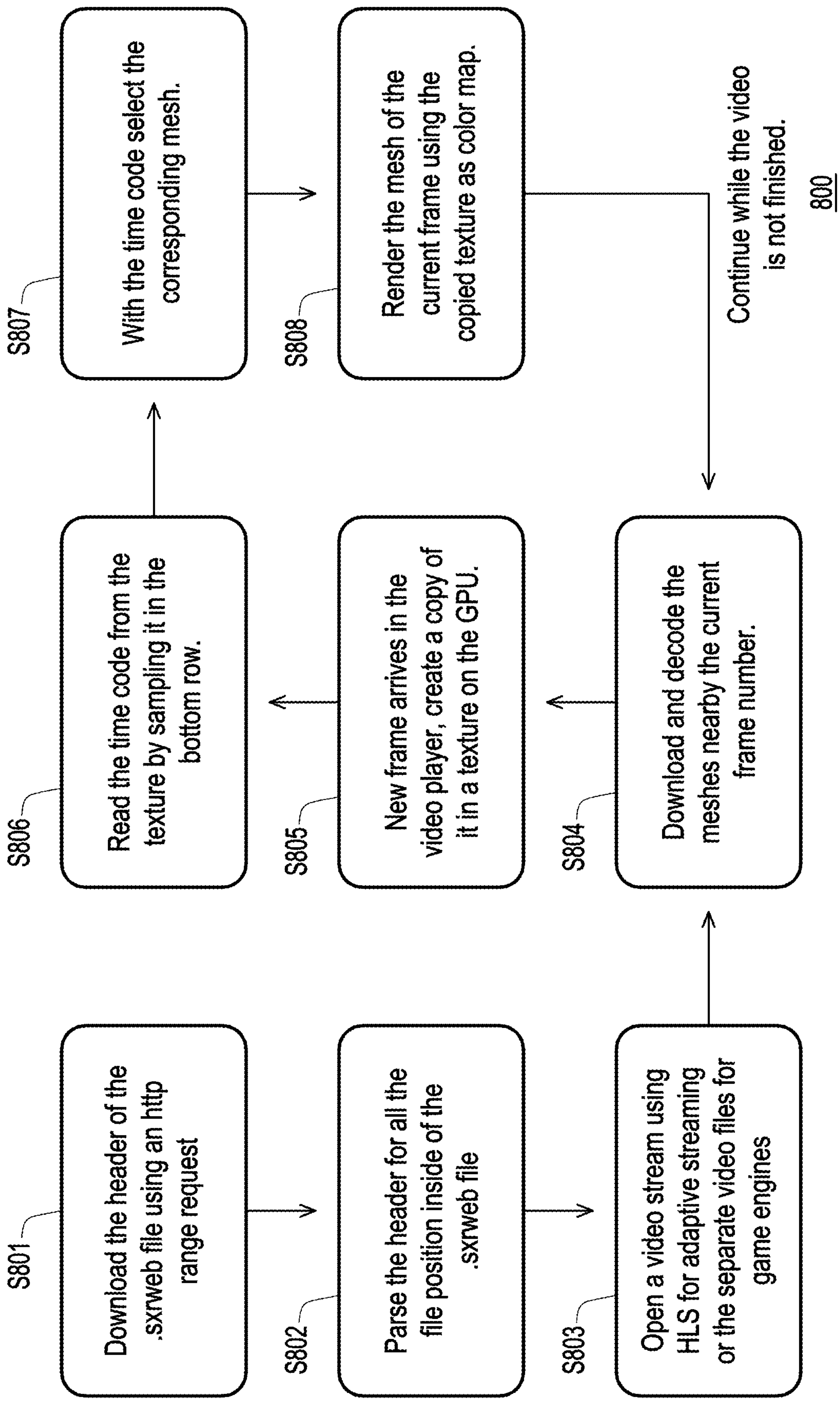
FIG. 8 is a schematic flowchart of a playing scenario of a volumetric video according to an embodiment of the disclosure.

FIG. 8 is a schematic flowchart of a playing scenario of a volumetric video according to an embodiment of the disclosure. With reference to FIG. 1 to FIG. 8, a playing scenario 800 depicts a playing process of a volumetric video. In one embodiment, while a user intends to play a volumetric video over the web or using a game engine, the user may utilize a player to execute the playing process for playing the volumetric video. However, this disclosure is not limited thereto.

First, in a step S801, the header file of the container file (e.g., the SXRWEB file) of the volumetric video may be downloaded from a server using an HTTP range request. In response to the HTTP range request, the server may provide the header to the player or the game engine. Next, in a step S802, the player or the game engine may parse (decode) the header file to find out all the file positions inside the container file. For example, by parsing the header file, a position of the JSON file may be located and the JSON file may be downloaded. Based on the JSON file, positions of rest of the files in the container file may be obtained. However, this disclosure is not limited thereto.

Afterwards, in a step S803, the player or the game engine may open a video stream using HLS for adaptive streaming or may open a video file of a certain quality (e.g., low quality, medium quality video, or high quality) for the game engine. For example, a current frame of the volumetric video may be obtained from the opened video stream or the opened video file. Based on a timecode 402 of the current frame in the volumetric video, a frame number of the current frame may be obtained. In one embodiment, the opened video includes the embedded texture 502 of the current frame. That is, the opened video may be called as a texture video. Then, in a step S804, based on the timecode 402, corresponding meshes of the original 3D models 501 nearby the current frame number may be loaded (or downloaded) and decoded. That is, not only meshes of the current frame of the original 3D model 501 are obtained, but also meshes of the original 3D model 501 of at least one nearby frame are obtained.

After that, in a step S805, when a new frame of the video stream or the video file arrives in the player or the game engine, a copy of the embedded textures 502 fetched from the video stream or the video file may be created on a graphics processing unit (GPU). Then, in a step S806, the GPU may be configured to obtain the timecode 402 (e.g., read from the bottom row of the embedded texture 502).

Subsequentially, in a step S807, based on the timecode 402, corresponding meshes of the original 3D model 501 may be selected (from the meshes already downloaded in the step S804). Then, in a step S808, the copy of the embedded textures 502 (stored in the GPU in the step S804) may be loaded and the textures 401 in the embedded textures 502 may be used as a color map for meshes of the original 3D model 501. That is, by applying the textures 401 (fetched from the video stream or the video file) to the meshes of the original 3D model 501, frames of the volumetric video (i.e., the rendered 3D model 503) nearby the current frame may be obtained and played. Moreover, if the volumetric video is not finished at the current frame, the step S804 to the step S808 may be performed repetitively until the end of the volumetric video.

In summary, according to the volumetric video processing system 100, the volumetric video processing method 200, and the playing scenario 800, since the timecode 402 is located within the embedded texture 403, while the user is searching for a certain frame of the volumetric video, only part of the embedded textures 403 of a plurality of frames may be needed to be loaded. That is, the user may be smart at loading the frames near the current timecode 402 easily. Therefore, the volumetric video may be streaming on the web in an efficient and low-latency manner.

It will be apparent to those skilled in the art that various modifications and variations can be made to the disclosed embodiments without departing from the scope or spirit of the disclosure. In view of the foregoing, it is intended that the disclosure covers modifications and variations provided that they fall within the scope of the following claims and their equivalents.

What is claimed is:

1. A volumetric video processing system, comprising:
- a storage circuit, storing a program code; and
- a processor, coupled to the storage circuit and accessing the program code to execute:
  - obtaining a texture of a frame of a volumetric video;
  - generating a timecode based on a frame number of the frame;
  - embedding the timecode into the texture to generate an embedded texture;
  - obtaining a 3D model of the frame;
  - storing the embedded texture and the 3D model together as the volumetric video;
  - obtaining the frame number from the volumetric video based on the timecode embedded in the embedded texture;
  - at a startup of playing, loading the 3D model and the embedded texture of first few frames needs to be loaded by a player based on the frame number; and
  - grabbing matching meshes nearby a current frame based on a current frame number according to the frame number, wherein in response to a certain frame of the volumetric video being searched, only part of the embedded textures is needed to be loaded.

2. The volumetric video processing system according to claim 1, wherein the processor further executes:
- converting the frame number from a text to an image to generate the timecode.

3. The volumetric video processing system according to claim 1, wherein the timecode is a binary image.

4. The volumetric video processing system according to claim 1, wherein the timecode is a row of black squares and white squares.

5. The volumetric video processing system according to claim 1, wherein the processor further executes:
- disposing the timecode at a top or a bottom of the texture to generate the embedded texture.

6. The volumetric video processing system according to claim 1, wherein the timecode is a column of black squares and white squares.

7. The volumetric video processing system according to claim 1, wherein the processor further executes:
- disposing the timecode at a left side or a right side of the texture to generate the embedded texture.

8. A volumetric video processing method, comprising:
- obtaining a texture of a frame of a volumetric video;
- generating a timecode based on a frame number of the frame;
- embedding the timecode into the texture to generate an embedded texture;
- obtaining a 3D model of the frame;
- storing the embedded texture and the 3D model together as the volumetric video;
- obtaining the frame number from the volumetric video based on the timecode embedded in the embedded texture;
- at a startup of playing, loading the 3D model and the embedded texture of first few frames needs to be loaded by a player based on the frame number; and
- grabbing matching meshes nearby a current frame based on a current frame number according to the frame number, wherein in response to a certain frame of the volumetric video being searched, only part of the embedded textures is needed to be loaded.

9. The volumetric video processing method according to claim 8, further comprising:
- converting the frame number from a text to an image to generate the timecode.

10. The volumetric video processing method according to claim 8, wherein the timecode is a binary image.

11. The volumetric video processing method according to claim 8, wherein the timecode is a row of black squares and white squares.

12. The volumetric video processing method according to claim 8, further comprising:

disposing the timecode at a top or a bottom of the texture to generate the embedded texture.

13. The volumetric video processing method according to claim 8, wherein the timecode is a column of black squares and white squares.

14. The volumetric video processing method according to claim 8, further comprising:

disposing the timecode at a left side or a right side of the texture to generate the embedded texture.

15. A volumetric video processing method, comprising:

obtaining a frame of a volumetric video;

obtaining a texture video from the frame of the volumetric video;

obtaining a texture and a timecode based on an embedded texture of the texture video;

obtaining a frame number of the frame based on the timecode;

obtaining a 3D model of the frame from the volumetric video based on the frame number;

applying the texture on the 3D model to generate a rendered 3D model;

obtaining the frame number from the volumetric video based on the timecode embedded in the embedded texture;

at a startup of playing, loading the 3D model and the embedded texture of first few frames needs to be loaded by a player based on the frame number; and grabbing matching meshes nearby a current frame based on a current frame number according to the frame number, wherein in response to a certain frame of the volumetric video being searched, only part of the embedded textures is needed to be loaded.

16. The volumetric video processing method according to claim 15, further comprising:

converting the timecode from an image to a text to an image to obtain the frame number.

17. The volumetric video processing method according to claim 15, wherein the timecode is a binary image.

18. The volumetric video processing method according to claim 15, wherein the timecode is a row of black squares and white squares.

19. The volumetric video processing method according to claim 15, wherein the timecode is a column of black squares and white squares.

20. The volumetric video processing method according to claim 15, further comprising:

loading a 3D model of a nearby frame based on the frame number.

* * * * *